US009468998B2

(12) United States Patent
Luo

(10) Patent No.: US 9,468,998 B2
(45) Date of Patent: Oct. 18, 2016

(54) RUBBER BAND MACHINE

(71) Applicant: NINGBO SUPREME ELECTRONIC MACHINERY CO., LTD., Ningbo, Zhejiang Province (CN)

(72) Inventor: Qian Luo, Ningbo (CN)

(73) Assignee: NINGBO SUPREME ELECTRONIC MACHINERY CO., LTD., Ningbo (CN)

( * ) Notice: Subject to any disclaimer, the term of this patent is extended or adjusted under 35 U.S.C. 154(b) by 251 days.

(21) Appl. No.: 14/377,417

(22) PCT Filed: Apr. 17, 2014

(86) PCT No.: PCT/CN2014/075542
§ 371 (c)(1),
(2) Date: Aug. 7, 2014

(87) PCT Pub. No.: WO2015/000323
PCT Pub. Date: Jan. 8, 2015

(65) Prior Publication Data
US 2015/0328727 A1    Nov. 19, 2015

(30) Foreign Application Priority Data

Jul. 2, 2013   (CN) .......................... 2013 1 0274121

(51) Int. Cl.
| | | |
|---|---|---|
| *B23P 19/04* | (2006.01) | |
| *D05B 35/06* | (2006.01) | |
| *D05B 27/10* | (2006.01) | |
| *B23P 19/00* | (2006.01) | |

(52) U.S. Cl.
CPC .............. *B23P 19/001* (2013.01); *B23P 19/04* (2013.01); *D05B 27/10* (2013.01); *D05B 35/06* (2013.01); *Y10T 29/5142* (2015.01); *Y10T 29/53052* (2015.01)

(58) Field of Classification Search
CPC .......... Y10T 29/5136; Y10T 29/5142; D05B 27/10
USPC ............................ 29/564, 564.6; 112/470.33
See application file for complete search history.

(56) References Cited

U.S. PATENT DOCUMENTS

| | | | | | |
|---|---|---|---|---|---|
| 3,968,710 | A | * | 7/1976 | Gros ...................... | B26D 1/185 |
| | | | | | 83/154 |
| 4,503,790 | A | * | 3/1985 | Keeton .................. | D05B 23/00 |
| | | | | | 112/470.33 |

FOREIGN PATENT DOCUMENTS

| | | | | |
|---|---|---|---|---|
| CN | 102286854 | B | * | 6/2012 |
| CN | 103350914 | A | * | 10/2013 |
| CN | 103352333 | A | * | 10/2013 |
| CN | 203360787 | U | * | 12/2013 |

OTHER PUBLICATIONS

Machine Translation of CN 102286854 B, which CN '854 was published Jun. 2012.*

* cited by examiner

*Primary Examiner* — Erica E Cadugan
(74) *Attorney, Agent, or Firm* — Jiwen Chen

(57) ABSTRACT

The present invention discloses a rubber band machine. The length of a rubber band to be conveyed may be set by controlling the angle of rotation of a first motor. The rubber band input by a first feeding drive wheel is stored between the first feeding drive wheel and a second feeding drive wheel so that the second feeding drive wheel coordinates with a looping device to continue to output the rubber band. During feeding, the rubber band machine can perform joint examination and ironing to the rubber band, and automatically cut the rubber band off at the discharge port of the second feeding drive wheel via a cutting device. The looping device grips the rubber band via a third gripper and moves rotationally to convey two ends of the rubber band to a first gripper and a second gripper, respectively. After the first gripper and the second gripper have gripped the two ends of the rubber band, the rubber band forms a rubber ring by rotational motion of the first gripper and the second gripper, and the two jointed ends of the rubber ring are fixed on a bracket for subsequent sewing and fixation. The looping device has the advantages of simple structure and automatic control, and the looping speed of rubber bands is thus greatly improved.

9 Claims, 7 Drawing Sheets

RUBBER BAND MACHINE

This is a U.S. national stage application of PCT Application No. PCT/CN2014/075542 under 35 U.S.C. 371, filed Apr. 17, 2014 in Chinese, claiming the priority benefit of Chinese Application No. 2013102741210, filed Jul. 2, 2013, which is hereby incorporated by reference.

TECHNICAL FIELD

The present invention relates to a rubber band machine for processing a rubber band into a rubber ring.

BACKGROUND OF THE INVENTION

During the production of rubber rings, the common manufacturing process is as follows: taking bundles or rolls of rubber bands as raw materials, cutting them into segments and sewing them into rings. During the production, those operations are accomplished manually or by a plurality of single machines with different functions. Chinese Utility Model Patent No. 201020269752.5 titled Rubber Band Feeding Device for Automatic Rubber band Machines, Chinese Utility Model Patent No. 201020269792.X titled Rubber Band Length Control Device for Automatic Rubber Band Machines, Chinese Utility Model Patent No. 201020269783.0 titled Cutting Device for Automatic Rubber Band Machines, Chinese Utility Model Patent No. 201020269797.2 titled Rubber Band Looping Device for Automatic Rubber Band Machines, and Chinese Utility Model Patent No. 201020269802.X titled Pulling Device for Automatic Rubber Band Machines disclosed a full-automatic rubber band processing equipment integrating sorting, feeding, length controlling, cutting, splicing and sewing in one equipment. Such a full-automatic rubber band processing equipment can automatically accomplish the whole production procedure of processing rubber bands into rubber rings. However, the processability and production assembly of such a full-automatic rubber band processing equipment can be further improved.

SUMMARY OF THE INVENTION

In view of the status of the prior art, the present invention provides a rubber band machine with higher processing efficiency.

To solve the above technical solution, the present invention employs the following technical solution: a rubber band machine is provided, comprising a feeding device, a cutting device and a looping device, characterized in that the feeding device comprises a first rack and a second rack arranged at intervals, the first rack being provided with a first feeding drive wheel driven by a first motor, the second rack being provided with a second feeding drive wheel driven by a second motor; the looping device comprises a first gripper capable of rotating around a first axis, a second gripper capable of rotating around a second axis, a bracket disposed between the first gripper and the second gripper, and a third gripper capable of rotating around a third axis; the first feeding drive wheel rotates and inputs a predetermined length of rubber band between the first feeding drive wheel and the second feeding drive wheel, the third gripper grips one end of the rubber band at the discharge port of the second feeding drive wheel and rotates around the third axis under the auxiliary feeding of the second feeding drive wheel to allow a predetermined length of the rubber band to pass through the first gripper and the second gripper, and then the rubber band at the discharge port of the second feeding drive wheel is cut by the cutting device; after gripping two ends of the cut rubber band, the first gripper and the second gripper rotate around the first axis and the second axis, respectively, to fix the two ends of the rubber band onto the bracket.

To optimize the above technical solution, the present invention further comprises the following improved technical solution.

The rubber band input by the first feeding drive wheel is suspended between the first feeding drive wheel and the second feeding drive wheel; a stock sensor for detecting the suspension state of the rubber band is disposed below the first feeding drive wheel; the second feeding drive wheel conveys the suspended rubber band when the third gripper moves rotationally; and, the first motor controls the first feeding drive wheel to convey a next predetermined length of the rubber band after the stock sensor detects that the rubber band in the suspended state is straightened.

The first rack is provided with a first feeding driven wheel fitted with the first feeding drive wheel; the second rack is provided with a second feeding driven wheel fitted with the second feeding drive wheel; a rubber band conveying passage is disposed above the first feeding drive wheel, and a heating plate for ironing the rubber band and a heating cylinder for controlling the heating plate to move close to or move away from the rubber band conveying passage are provided on one side of the rubber band conveying passage.

A joint sensor for detecting the thickness of the rubber band is provided on one side of the rubber band conveying passage, and the joint sensor controls the first motor to stop working when detecting that the thickness of the rubber band becomes larger.

The cutting device comprises a moving cutter and a stationary cutter disposed at the discharge port of the second feeding drive wheel, the moving cutter being connected to the drive rod of a cutting cylinder.

The looping device comprises a third rack on which a slidable base is disposed, the base being connected to the drive rod of a sliding cylinder; and, the first gripper, the second gripper and the bracket are all disposed on the base.

The base is provided with a first rotating cylinder for driving the first gripper to rotate around the first axis and a second rotating cylinder for driving the second gripper to rotate around the second axis at intervals, and the distance from the first axis to the second axis is adjustable.

The third rack is provided with a third drive shaft capable of rotating, and one end of the third drive shaft is connected to the third gripper via a third connecting arm while the other end thereof is linked to a third rotating cylinder on the third rack.

A second guide rail, on which the bracket is slidably disposed, is disposed on the base, and a tension spring is disposed between the bracket and the base.

Compared with the prior art, the rubber band machine provided by the present invention can allow the first feeding drive wheel to convey a predetermined length of rubber band by controlling the angle of rotation of the first motor, and each segment of the rubber band input by the first feeding drive wheel is stored between the first feeding drive wheel and the second feeding drive wheel so that the second feeding drive wheel coordinates with a looping device to output the rubber band continuously. During feeding, the rubber band machine may perform joint examination and ironing to the rubber band, and automatically cut the rubber band off at the discharge port of the second feeding drive wheel via the cutting device. The looping device grips the rubber band via the third gripper and moves rotationally to convey two ends of the rubber band to the first gripper and the second gripper, respectively. After the first gripper and the second gripper have gripped the two ends of the rubber band, the rubber band forms a rubber ring by rotational motion of the first gripper and the second gripper, and the two jointed ends of the rubber ring are fixed on the bracket for subsequent sewing and fixation. The looping device has the advantages of simple structure and automatic control, and the looping speed of rubber bands is thus greatly improved.

Figure 1:
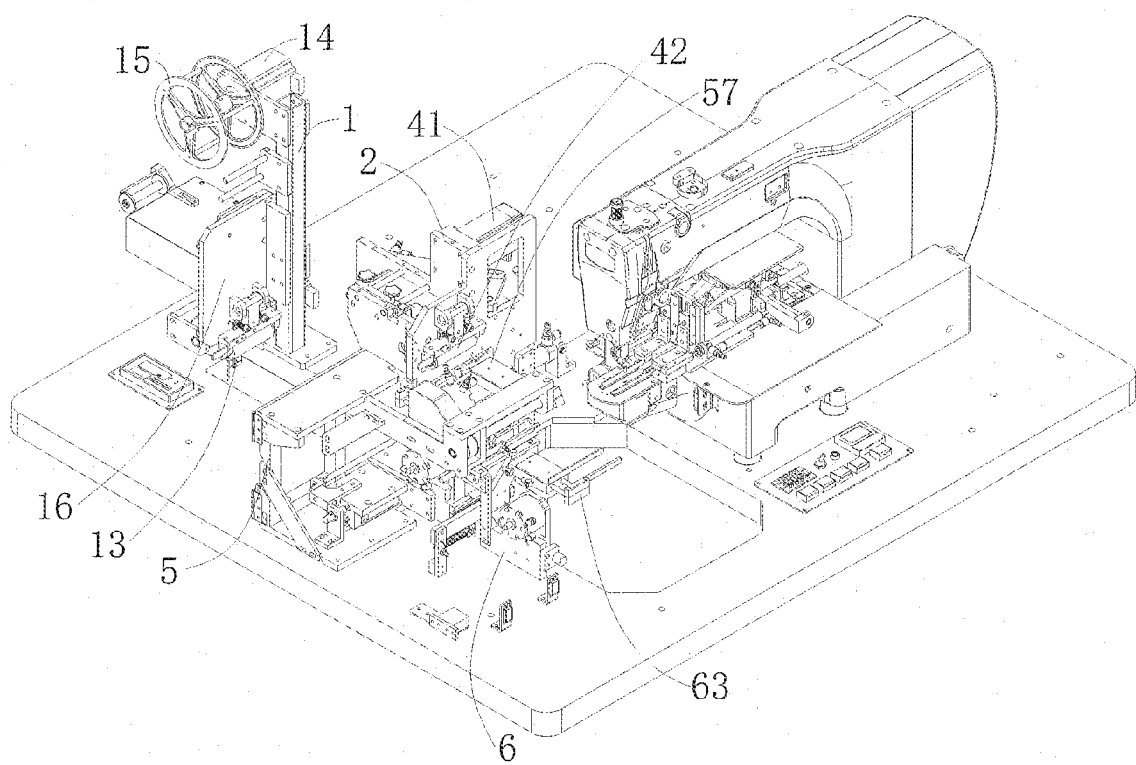
FIG. 1 is a stereoscopic/three dimensional structure diagram according to an embodiment of the present invention.

In the drawings, the meanings of the reference numerals are as follows: 1—First rack; 11—Heating plate; 11a—Heating guide rail; 11b—Electrical heating rod; 12—Heating cylinder; 12—Stock sensor; 14—Third motor; 15—Material sorting roller; 16—Backup plate; 17—Adjusting and limiting stopper; 18—Joint sensor; 18a—Sensing flap; 2—Second rack; 21—First mounting substrate; 22—Second mounting substrate; 23—Third mounting substrate; 24—Feeding carrier; 25—Driven wheel shaft; 26—Adjusting block; 3—First feeding drive wheel; 31—First motor; 32—First feeding driven wheel; 33—First driven wheel mounting support; 34—First spring; 4—Second feeding drive wheel; 4a—Rotary drive shaft; 41—Second motor; 41a—First synchronous wheel; 41b—Second synchronous wheel; 41c—First synchronous belt; 42—Second feeding driven wheel; 43—Second driven wheel mounting support; 44—Second spring; 5—Third rack; 5a—Bedplate; 5b—Support frame; 51—Sliding cylinder; 52—Third drive shaft; 52a—Third synchronous wheel; 53—Third connecting arm; 54—Third rotating cylinder; 54a—Fourth synchronous wheel; 54b—Second synchronous belt; 55—First guide rail; 57—Third gripper; 6—Base; 61—Bracket; 61a—Material support frame; 62—Second gripper; 63a—Second cylinder mounting plate; 63b—Second drive shaft; 63c—Second connecting arm; 63d—Second rotating cylinder; 64—Second guide rail; 65—Tension spring; 66—Support plates; 67—Connecting plate; 67a—Carrier mounting frame; 67b—Carrier; 68—Air pipe mounting support; 68a—Air blowpipe; 68b—Mounting shaft; 68c—Positioning backup plate; 7—Moving cutter; 71—Stationary cutter; 72—Cutting cylinder; 73—Moving cutter mounting frame; 74—Moving cutter arm; 8—Gripping cylinder; 81—Fixed arm; and, 82—Moving arm.

DETAILED DESCRIPTION OF THE INVENTION

Embodiments of the present invention will be further described as below in details with reference to the accompanying drawings.

As shown in FIG. 1, the rubber band machine provided by the present invention comprises a feeding device, a cutting device and a looping device. The feeding device comprises a first rack 1 and a second rack 2 arranged at intervals. The first rack 1 is provided with a first feeding drive wheel 3 driven by a first motor 31. The second rack 2 is provided with a second feeding drive wheel 4 driven by a second motor 41. The looping device comprises a first gripper 62 capable of rotating around a first axis, a second gripper 63 capable of rotating around a second axis, a bracket 61 disposed between the first gripper 62 and the second gripper 63, and a third gripper 57 capable of rotating around a third axis. The first feeding drive wheel 3 rotates and inputs a predetermined length of rubber band between the first feeding drive wheel 3 and the second feeding drive wheel 4. The third gripper 57 grips one end of the rubber band at the discharge port of the second feeding drive wheel 4 and rotates around the third axis under the auxiliary feeding of the second feeding drive wheel 4 to allow a predetermined length of the rubber band to pass through the first gripper 62 and the second gripper 63, and then the rubber band at the discharge port of the second feeding drive wheel 4 is cut by the cutting device. After gripping two ends of the cut rubber band, the first gripper 62 and the second gripper 63 rotate around the first axis and the second axis, respectively, to fix the two ends of the rubber band onto the bracket 61.

Figure 2:
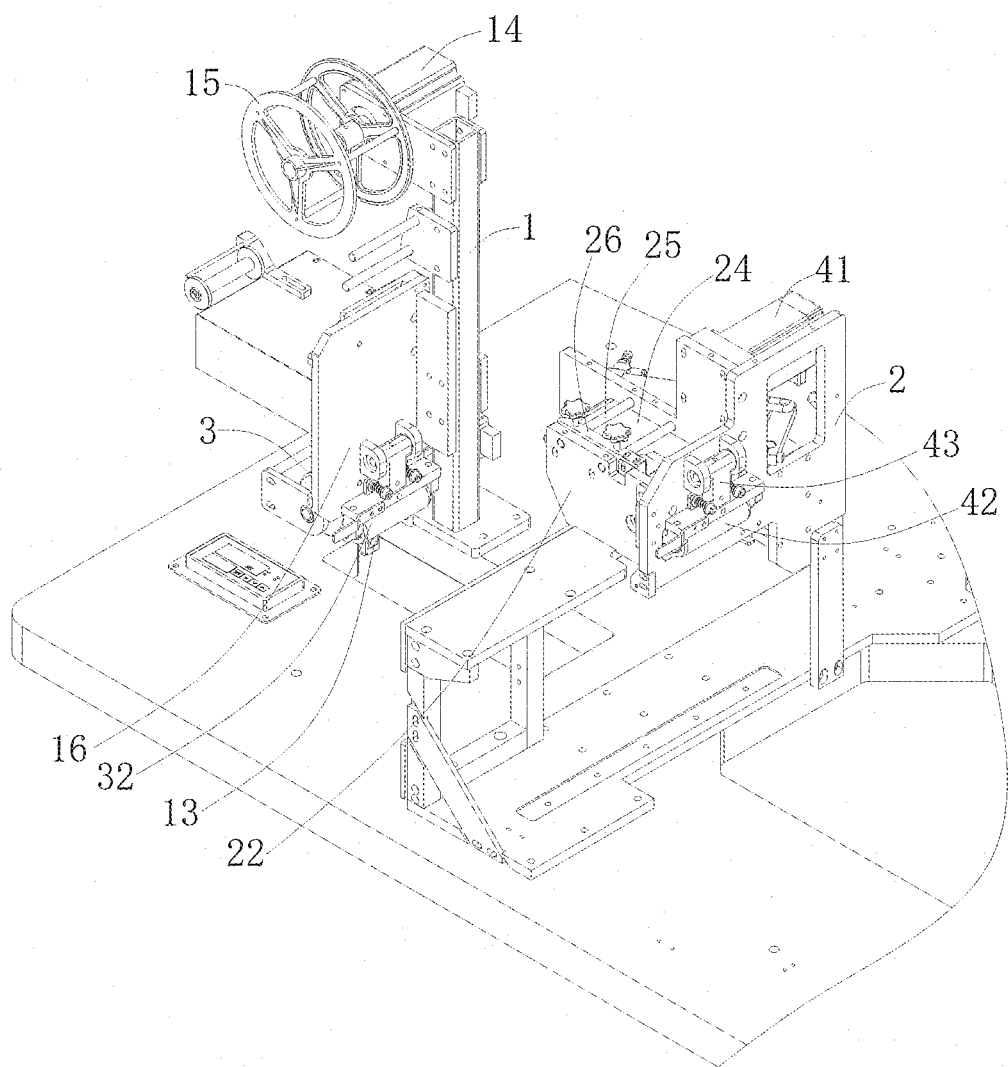
FIG. 2 is a stereoscopic structure diagram of a feeding part of FIG. 1.

As shown FIG. 2, the feeding device of the rubber band machine comprises a first rack 1 and a second rack 2 spaced apart from each other. The first rack 1 is provided with a first feeding drive wheel 3 driven by a first motor 31. The second rack 2 is provided with a second feeding drive wheel 4 driven by a second motor 41. The first feeding drive wheel 3 inputs a predetermined length of rubber band under the control of the first motor 31, and the rubber band is suspended between the first feeding drive wheel 3 and the second feeding drive wheel 4. A stock sensor 13 for detecting the suspension state of the rubber band is disposed below the first feeding drive wheel 3. The second feeding drive wheel 4 conveys the suspended rubber band under the control of the second motor 41. The first motor 31 controls the first feeding drive wheel 3 to convey a next predetermined length of the rubber band after the stock sensor 13 detects that the rubber band in the suspended state is straightened.

Figure 3:
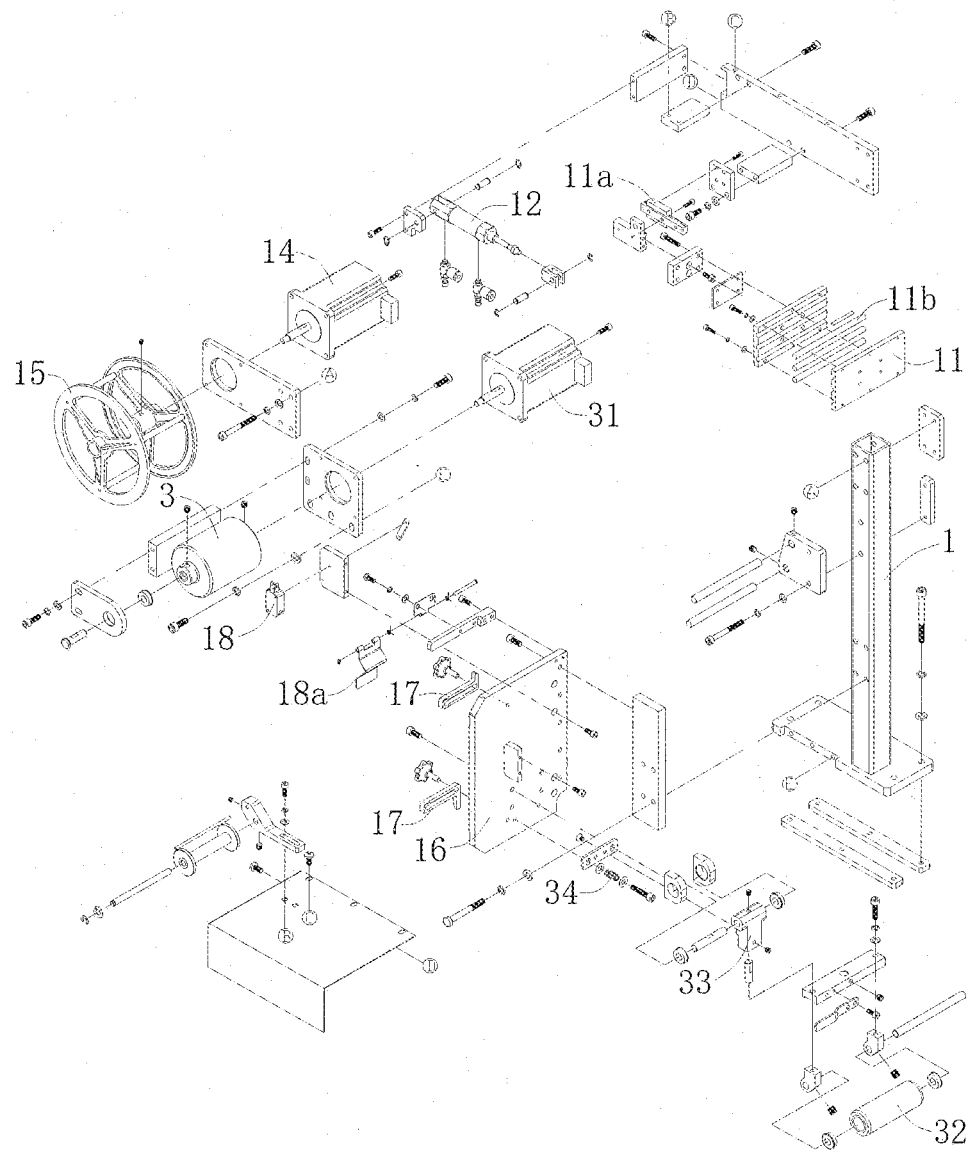
FIG. 3 is an exploded assembly view of a first rack part of FIG. 2.

FIG. 3 shows an exploded assembly view of the first rack 1 part. A rubber band conveying passage is disposed above the first feeding drive wheel 3. A material sorting roller 15 driven by the third motor 14 is disposed above the first feeding drive wheel 3. The rubber band conveying passage is vertically disposed between the material sorting roller 15 and the first feeding drive wheel 3.

In this embodiment, the first rack 1 is fixedly connected with a backup plate 16, and the rubber band conveying passage is vertically disposed on the backup plate 16. An adjusting and limiting stopper 17 for adjusting the width of the rubber band conveying passage is disposed on the backup plate 16.

A heating plate 11 for ironing the rubber band and a heating cylinder 12 for controlling the heating plate 11 to move close to or move away from the rubber band conveying passage is disposed on one side of the rubber band conveying passage.

When the first motor 31 works, the heating cylinder 21 controls the heating plate 11 to move close to the rubber band inside the rubber band conveying passage, and irons the rubber band being conveyed. When the first motor 31 stops working, the heating cylinder 12 controls the heating plate 11 to move away from the rubber band conveying passage.

The first rack 1 is provided with a heating guide rail 11a on which the heating plate 11 is slidably disposed. An electrical heating rod 11b is provided in the heating plate 11.

A joint sensor 18 for detecting the thickness of the rubber band is disposed on one side of the rubber band conveying passage. The rubber band may have joints which cannot be allowed during the manufacturing of rubber rings. As the thickness of the rubber band at a joint becomes larger, the first motor 31 and the second motor 41 are controlled to stop conveying the rubber band when the joint sensor 18 detects the thickness of the rubber band becomes larger, so that it is convenient for workers to remove the joints of the rubber band.

The joint sensor 18 is provided with a freely suspended sensing flap 18a. One bent portion of the sensing flap 18a is fitted with the vertical rubber band in the rubber band conveying passage, while the other bent portion of the sensing flap 18a is positioned in the vicinity of a contact point of the joint sensor 18. When there is a joint on the rubber band, the sensing flap 18a comes into contact with the contact point of the joint sensor 18, so that the joint sensor 18 detects the joint of the rubber band and timely controls the feeding device to stop working.

The first feeding drive wheel 3 is provided with a first feeding driven wheel 32 clung thereto due to elasticity. A first driven wheel mounting support 33 capable of rotating is disposed on the other side of the backup plate 16. The first feeding drive wheel 3 is rotatably disposed on the first driven wheel mounting support 33. The backup plate 16 is provided with a first spring 34 fitted with the first driven wheel mounting support 33. One end of the first spring is fitted with a mounting rod on the backup plate 16, while the other end thereof is fitted with a connecting member on the first driven wheel mounting support 33. The first driven wheel mounting support 33 enables in the aid of the elasticity of the first spring 34 the first feeding driven wheel 32 to cling to the first feeding drive wheel 3.

Figure 4:
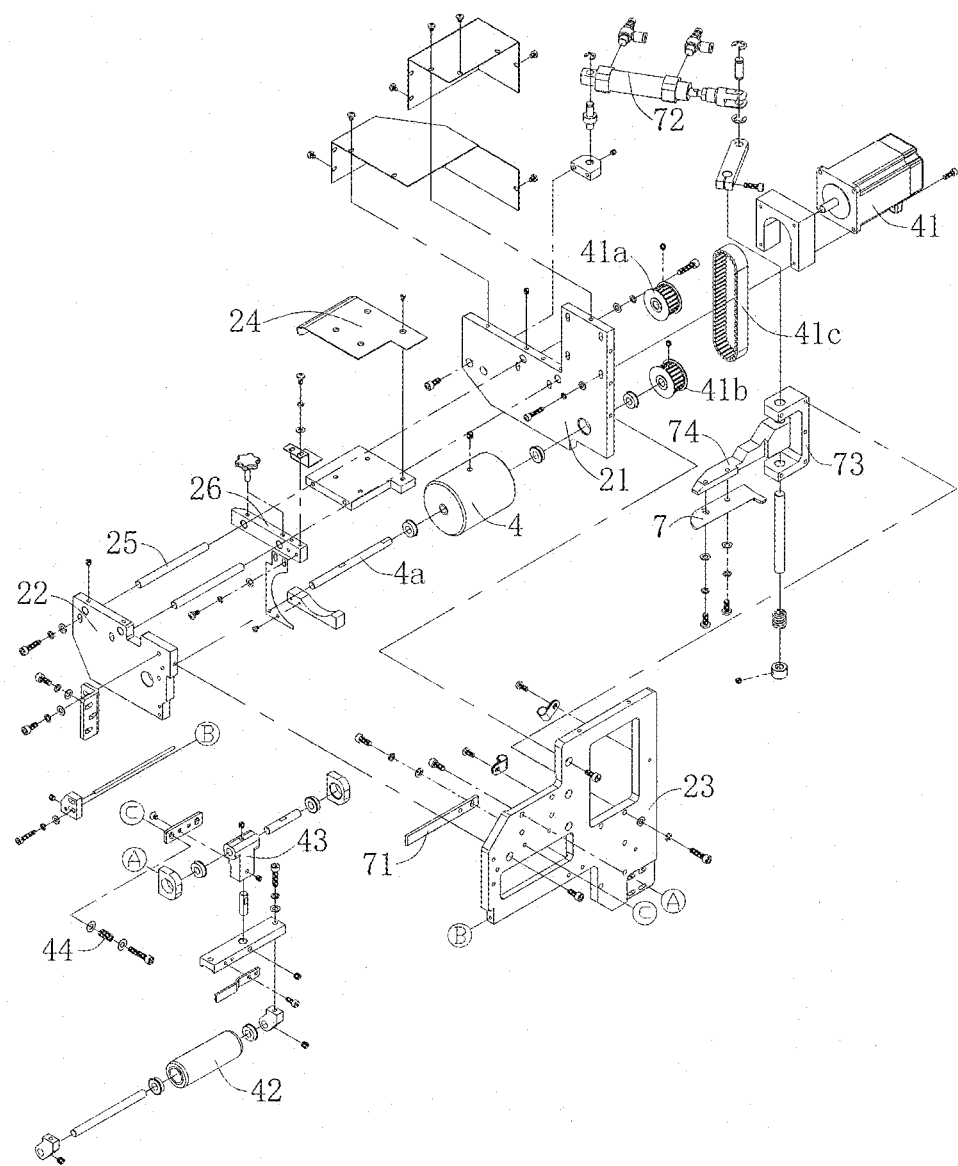
FIG. 4 is an exploded assembly view of a second rack part of FIG. 2.

FIG. 4 shows an exploded assembly view of the second rack 2 part. The second rack 2 comprises a first mounting substrate 21 and a second mounting substrate 22 which are provided in parallel, and a third mounting substrate 23 vertically connected to the first mounting substrate 21 and the second mounting substrate 22, respectively.

A rubber band conveying passage is provided between the first mounting substrate 21 and the second mounting substrate 22. A feeding carrier 24 is fixed between the first mounting substrate 21 and the second mounting substrate 22. A driven wheel shaft 25 is disposed above the feeding carrier 24. The rubber band conveying passage is positioned between the feeding carrier 24 and the driven wheel shaft 25.

After conveyed by the first feeding drive wheel 3, the rubber band passes between the driven wheel shaft 25 and the feeding carrier 24 and is then conveyed by the second feeding drive wheel 4. An adjusting block 26 capable of adjusting the width of the rubber band conveying passage is disposed on the driven wheel shaft 25 in order to adapt for conveying rubber bands in different width.

The second feeding drive wheel 4 is rotatably disposed between the first mounting substrate 21 and the second mounting substrate 22. The second motor 41 and the second feeding drive wheel 4 are positioned on two sides of the first mounting substrate 21, respectively. A power output shaft of the second motor 41 is connected with a first synchronous wheel 41a. The rotary drive shaft 4a of the second feeding drive wheel 4 passes through the first mounting substrate 21, and the outgoing end thereof is connected with a second synchronous wheel 41b. A first synchronous belt 41c is disposed between the first synchronous wheel 41a and the second synchronous wheel 41b. The second motor 41 drives the second feeding drive wheel 4 to move via the first synchronous wheel 41a, the first synchronous belt 41c and the second synchronous wheel 41b.

A moving cutter 7 and a stationary cutter 71 for cutting the rubber band off are disposed at the discharge port of the second feeding drive wheel 4. The moving cutter 7 cuts off the rubber band at the discharge port via a cutting cylinder 72 after the second feeding drive wheel 4 completes the feeding of the rubber band.

In this embodiment, a moving cutter mounting frame 73 is fixedly connected to one side of the third mounting substrate 23 close to the first feeding drive wheel 3. The moving cutter mounting frame 73 is provided with a moving cutter arm 74 capable of rotating. The moving cutter 7 is fixed on the moving cutter arm 74 and positioned below the second feeding drive wheel 4.

The cutting cylinder 72 for driving the moving cutter 7 to rotate is movably mounted on the first mounting substrate 21, and positioned below the second motor 41. The drive rod of the cutting cylinder 72 drives the moving cutter arm 74 to rotate via a connecting rod.

The second feeding drive wheel 4 is provided with a second feeding driven wheel 42 clung thereto due to elasticity. A second driven wheel mounting support 43 capable of rotating is disposed on the outer side of the third mounting substrate 23, and the second feeding driven wheel 42 is rotatably disposed on the second driven wheel mounting support 43. The third mounting substrate 23 is provided with a second spring 44 fitted with the second driven wheel mounting support 43. One end of the second spring 44 is fitted with a mounting rod on the third mounting substrate 23, while the other end thereof enables due to the elasticity the second feeding driven wheel 42 on the second driven wheel mounting support 43 to compress the second feeding drive wheel 4.

When in work, the rubber band passes between the first feeding drive wheel 3 and the first feeding driven wheel 32 at first, and then passes between the second feeding drive wheel 4 and the second feeding driven wheel 42. A stock sensor 13 is fixedly disposed below the first feeding drive wheel 3. The length of the rubber band conveyed by the first feeding drive wheel 3 may be controlled by controlling the rotating revolutions of the first motor 31. After the first feeding drive wheel 3 conveys a predetermined length of rubber band, the rubber band is suspended between the first feeding drive wheel 3 and the second feeding drive wheel 4, and the suspended rubber band coordinates with the stock sensor 13 to enable the stock sensor 13 to detect that the rubber band is in the suspended state.

When the third gripper 57 grips and rotates the rubber band, the second motor 41 controls the second feeding drive wheel 4 to feed quickly and output the rubber band for subsequent looping operation. The rubber band suspended between the first feeding drive wheel 3 and the second feeding drive wheel 4 is straightened gradually. The rubber band after straightened is separated from the stock sensor 13, and the stock sensor 13 controls the first motor 31 to make the first feeding drive wheel 3 convey a next segment of the rubber band after detecting that the rubber band is separated from it.

Figure 5:
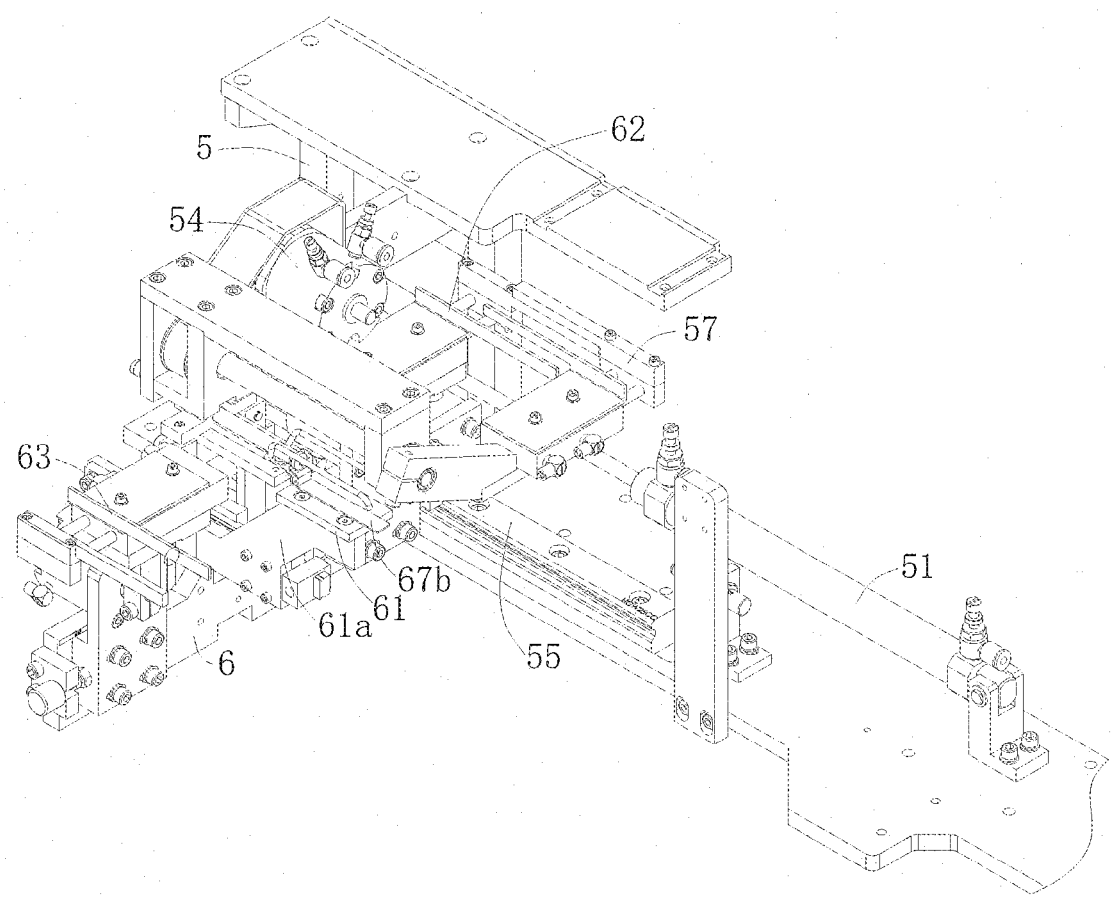
FIG. 5 is a stereoscopic structure diagram of a looping device of FIG. 1.
Figure 6:
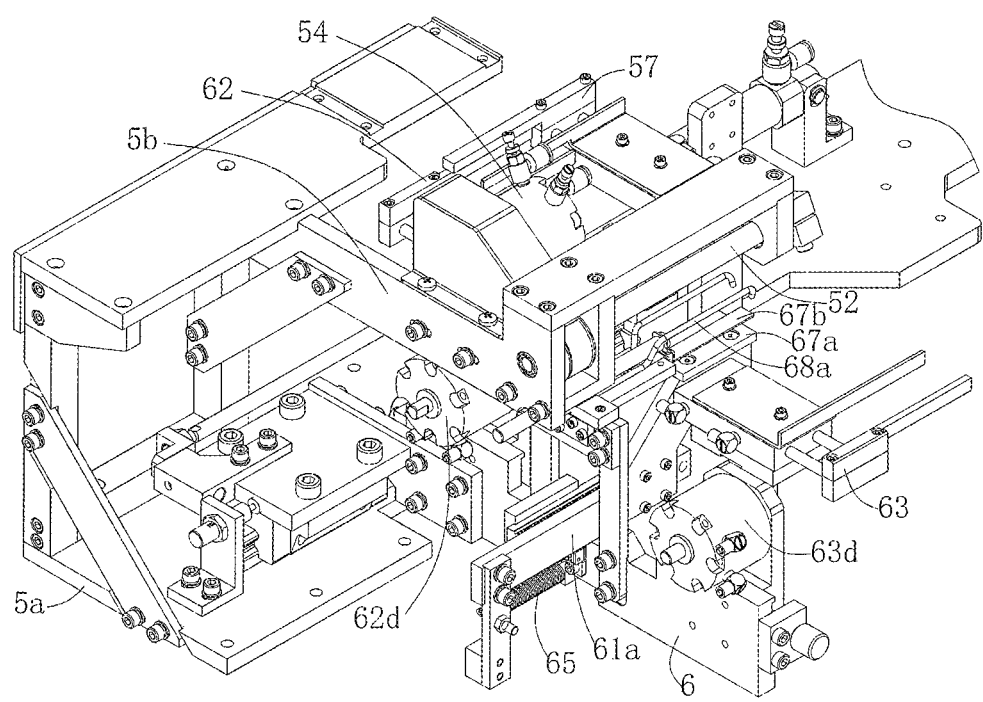
FIG. 6 is a rear stereoscopic structure diagram of FIG. 5.
Figure 7:
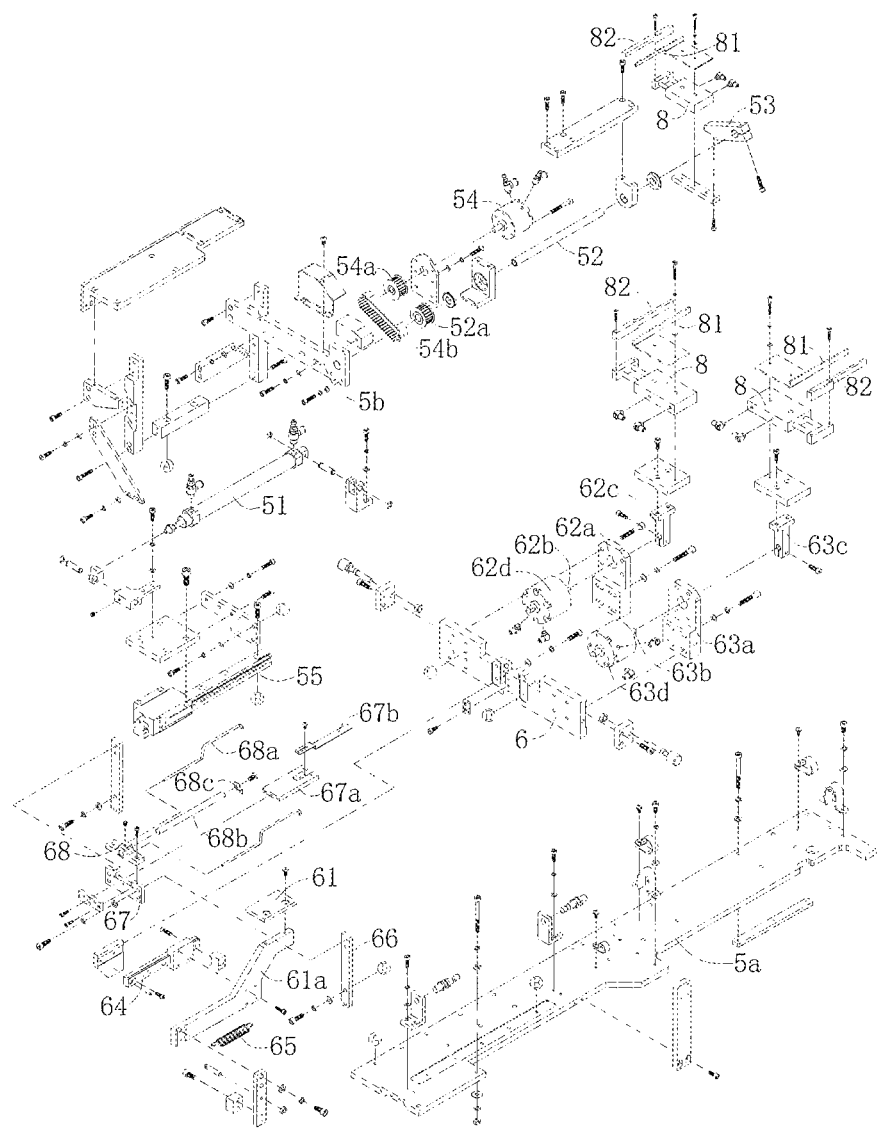
FIG. 7 is an exploded assembly view of FIG. 6.

As shown in FIG. 5, the looping device of the rubber band machine comprises a third rack 5 and a base 6 disposed on the third rack 5. In this embodiment, the third rack 5 is a composite member consisting of a bedplate 5a and a support frame 5b. The third rack 5 is positioned below the second rack 2, so that it is convenient for the third gripper 57 to grip the rubber band at the discharge port of the second feeding drive wheel 4.

A first guide rail 55 is provided on the bedplate 5a of the third rack 5, while the base 6 is slidably disposed on the first guide rail 55. A sliding cylinder 51 for driving the base 6 to slide is disposed on the third rack 5. By controlling the base 6 to move via the sliding cylinder 51, the looped rubber band may be conveyed to a sewing position for sewing.

The first gripper 62 and the second gripper 63 for gripping the rubber band are disposed on the base 6 at intervals, and may rotate around the first axis and the second axis, respectively. In this embodiment, a first cylinder mounting plate 62a and a second cylinder mounting plate 63a are fixed on the base 6 at intervals, with a first rotating cylinder 62d and a second rotating cylinder 63d being mounted on the first cylinder mounting plate 62a and the second cylinder mounting plate 63a, respectively.

The first rotating cylinder 62d is provided with a first drive shaft 62b connected to the first gripper 62 via a first connecting arm 62c. The first axis is coincided with the axis of the first drive shaft 62b. The second rotating cylinder 63d is provided with a second drive shaft 63b connected to the second gripper 63 via a second connecting arm 63c. The second axis is coincided with the axis of the second drive shaft 63b.

The first rotating cylinder 62d may drive the first gripper 62 to rotate around the first drive shaft 62b where the first axis is located. The second rotating cylinder 63d may drive the second gripper 63 to rotate around the second drive shaft 63b where the second axis is located.

The first cylinder mounting plate 62a and the second cylinder mounting plate 63a are formed with adjustable mounting grooves, respectively. The positions of the first cylinder mounting plate 62a and the second cylinder mounting plate 63a on the base 6 may be adjusted by the adjustable mounting grooves, thereby adjusting the distance from the first axis to the second axis.

A bracket 61 is disposed between the first gripper 62 and the second gripper 63, and fixed on the base 6 via a material support frame 61a.

The material support frame 61a has an extended end which is positioned between the first gripper 62 and the second gripper 63. The bracket 61 is fixed on the end of the material support frame 61a. The first rotating cylinder 62d and the second rotating cylinder 63d may drive the corresponding first gripper 62 and second gripper 63 to rotate, respectively, to fix the gripped rubber band onto the bracket 61.

In this embodiment, the extended end of the material support frame 61a is protruded relatively. The bracket 61 will run into a sewing device in the process of moving the base 6 to the sewing position. Therefore, during the movement of the base 6, the movement stroke of the bracket 61 is less than that of the base 6. To make the movement stroke of the bracket 61 less than that of the base 6, a second guide rail 64 is disposed on the base 6. The second guide rail 64 is positioned between the first cylinder mounting plate 62a and the second cylinder mounting plate 63a. The material support frame 61a is slidably disposed on the second guide rail 64, and a tension spring 65 is provided between the material support frame 61a and the base 6. In this way, the bracket 61 may stop moving when running into the sewing device, and the base 6 continues to move and convey the looped rubber band to the sewing position.

The base 6 is connected to a connecting plate 67 via two support plates 66. An air pipe mounting support 68 is fixed at the upper part of the connecting plate 67. The air pipe mounting support 68 is provided with two air blowpipes 68a connected to an air pump. The outlets of the air blowpipes 68a are positioned above the bracket 61. A mounting shaft 68b is fixed between the two air blowpipes 68a, and fixedly provided thereon with a positioning backup plate 68c for positioning the rubber band. A carrier mounting frame 67a, fixed with a carrier 67b, is fixed on the side wall of the connecting plate 67. The carrier 67b is positioned above the bracket 61. When rotating to the position of the bracket 61, the first gripper 62 and the second gripper 63 are rightly positioned on two sides of the carrier 67b.

The third rack 5 is provided with the third gripper 57 capable of rotating around the third axis, and a third rotating cylinder 54 for driving the third gripper 57 to rotate around the third axis.

Before looping the rubber band, the first gripper 62 and the second gripper 63 are positioned on two sides of the bracket 61, and the third axis is positioned between the first axis and the second axis. The radius, by which the third gripper 57 rotates around the third axis, is rightly fitted with the distance from the third gripper 57 to the first gripper 62 and the second gripper 63. Thus, the third gripper 57 may pass through the unfolded first gripper 62 and second gripper 63, respectively, while rotating around the third axis.

The third rotating cylinder 54 may directly drive the third gripper 57 to move rotationally, or may drive the third gripper 57 to move rotationally via a transmission structure.

In this embodiment, the support frame 5b of the third rack 5 is provided with a third drive shaft 52 capable of rotating, with the axis of the third drive shaft 52 being coincided with the third axis. The third drive shaft 52 is connected to the third gripper 57 via a third connecting arm 53. The third gripper 57 may rotate around the third drive shaft 52 where the third axis is located. A third synchronous wheel 52a is fixed on the third drive shaft 52. A fourth synchronous wheel 54a is fixedly provided on the drive shaft of the third rotating cylinder 54. The third synchronous wheel 52a is linked to the fourth synchronous wheel 54a via a second synchronous belt 54b.

In this embodiment, with a similar structure, the first gripper 62, the third gripper 63 and the third gripper each comprises a fixed arm 81, a moving arm 82 and a gripping cylinder 8 for driving the moving arm 82 to coordinate with the fixed arm for gripping. The fixed arm 81 is mounted on the body of the gripping cylinder 8, while the moving arm 82 is connected to the piston rod of the gripping cylinder 8. The moving arm 82 may be controlled to coordinate with the fixed arm 81 for gripping under the drive of the gripping cylinder 8.

When in work, the first gripper 62 and the second gripper 63 are positioned on two sides of the bracket 61, respectively, and are unfolded for gripping. The third gripper 57 grips an end of the rubber band at the discharge port of the second feeding drive wheel 4, and rotates around the third axis to allow the end of the end of the rubber band to pass through the unfolded first gripper 62 and second gripper 63. After the first gripper 62 and the second gripper 63 have gripped corresponding portions of the rubber band, the cutting device cuts off the segment of rubber band gripped by the first gripper 62 and the second gripper 63. At this time, two ends of this segment of rubber band have been gripped by the first gripper 62 and the second gripper 63.

Subsequently, the first gripper 62 and the second gripper 63 move rotationally to the position of the bracket 61, respectively, where the two ends of the rubber band are fixedly joined on the bracket 61, and the rubber band is spliced into a ring. The sliding cylinder 51 controls the base 6 to move to convey the first gripper 62, the second gripper 63 and the bracket 61 to the sewing position for sewing. The air blowpipes 68a and the positioning backup plate 68c may assist in positioning the looped rubber band, thereby conveying the rubber ring to the sewing device.

The distance from the first axis to the second axis can be adjusted by adjusting the mounting positions of the first cylinder mounting plate 62a and the second cylinder mounting plate 63a. During looping a rubber band, the connecting parts are overlapped or spliced as required. When the distance from the first axis to the second axis shortens, two ends of the rubber band are overlapped after the first gripper 62 and the second gripper 63 rotate and fold the rubber band. When the distance from the first axis to the second axis increases, two ends of the rubber band are spliced after the first gripper 62 and the second gripper 63 rotate and fold the rubber band.

The preferred embodiment of the present invention has been described above. Various changes or variations made by an ordinary person of skill in the art shall not depart from the scope of the present invention.

The invention claimed is:

1. A rubber band machine, comprising a feeding device, a cutting device and a looping device, characterized in that the feeding device comprises a first rack (1) and a second rack (2) arranged at an interval, the first rack (1) being provided with a first feeding drive wheel (3) driven by a first motor (31), the second rack (2) being provided with a second feeding drive wheel (4) driven by a second motor (41); the looping device comprises a first gripper (62) capable of rotating around a first axis, a second gripper (63) capable of rotating around a second axis, a bracket (61) disposed between the first gripper (62) and the second gripper (63), and a third gripper (57) capable of rotating around a third axis; wherein the first feeding drive wheel (3) rotates and inputs a predetermined length of rubber band between the first feeding drive wheel (3) and the second feeding drive wheel (4), the third gripper (57) grips one end of the rubber band at a discharge port of the second feeding drive wheel (4) and rotates around the third axis under auxiliary feeding of the second feeding drive wheel (4) to allow a predetermined length of the rubber band to pass through the first gripper (62) and the second gripper (63), and then the rubber band at the discharge port of the second feeding drive wheel (4) is cut by the cutting device; and wherein after each gripping a respective one of two ends of the cut rubber band, the first gripper (62) and the second gripper (63) rotate around the first axis and the second axis, respectively, to fix the two ends of the rubber band onto the bracket (61).

2. The rubber band machine according to claim 1, characterized in that the rubber band input by the first feeding drive wheel (3) is suspended between the first feeding drive wheel (3) and the second feeding drive wheel (4); a stock sensor (13) for detecting a suspension state of the rubber band is disposed below the first feeding drive wheel (3); the second feeding drive wheel (4) conveys the suspended rubber band when the third gripper (57) moves rotationally; and, the first motor (31) controls the first feeding drive wheel (3) to convey a next predetermined length of the rubber band after the stock sensor (13) detects that the rubber band in the suspended state is straightened.

3. The rubber band machine according to claim 2, characterized in that the first rack (1) is provided with a first feeding driven wheel (32) fitted with the first feeding drive wheel (3); the second rack (2) is provided with a second feeding driven wheel (42) fitted with the second feeding drive wheel (4); a rubber band conveying passage is disposed above the first feeding drive wheel (3), and a heating plate (11) for ironing the rubber band and a heating cylinder (12) for controlling the heating plate (11) to move closer to or move away from the rubber band conveying passage are provided on one side of the rubber band conveying passage.

4. The rubber band machine according to claim 3, characterized in that a joint sensor (18) for detecting the thickness of the rubber band is provided on one side of the rubber band conveying passage, and the joint sensor (18) controls the first motor (31) to stop working when detecting that the thickness of the rubber band becomes larger.

5. The rubber band machine according to claim 1, characterized in that the cutting device comprises a moving cutter (7) and a stationary cutter (71) disposed at the discharge port of the second feeding drive wheel (4), the moving cutter (7) being connected to a drive rod of a cutting cylinder (72).

6. The rubber band machine according to claim 1, characterized in that the looping device comprises a third rack (5) on which a slidable base (6) is disposed, the base (6) being connected to a drive rod of a sliding cylinder (51); and, the first gripper (62), the second gripper (63) and the bracket (61) are all disposed on the base (6).

7. The rubber band machine according to claim 6, characterized in that the base (6) is provided with a first rotating cylinder (62d) for driving the first gripper (62) to rotate around the first axis and a second rotating cylinder (63d) for driving the second gripper (63) to rotate around the second axis, and the distance from the first axis to the second axis is adjustable.

8. The rubber band machine according to claim 7, characterized in that the third rack (5) is provided with a drive shaft (52) capable of rotating, and one end of the did drive shaft (52) is connected to the third gripper (57) via a connecting arm (53) while the other end thereof is linked to a third rotating cylinder (54) on the third rack (5).

9. The rubber band machine according to claim 8, characterized in that a guide rail (64), on which the bracket (61) is slidably disposed, is disposed on the base (6), and a tension spring (65) is disposed between the bracket (61) and the base (6).

* * * * *